United States Patent
Chen et al.

(10) Patent No.: US 7,619,379 B2
(45) Date of Patent: Nov. 17, 2009

(54) MOTOR CONTROL DEVICE AND SETTING METHOD THEREOF

(75) Inventors: Hong-Jen Chen, Taoyuan Hsien (TW); Keittipermsak Rungcharoen, Taoyuan Hsien (TW); Sukudom Saravut, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 309 days.

(21) Appl. No.: 11/724,195

(22) Filed: Mar. 15, 2007

(65) Prior Publication Data
US 2008/0018272 A1    Jan. 24, 2008

(30) Foreign Application Priority Data
Mar. 31, 2006    (TW) .............................. 95111461 A

(51) Int. Cl.
*H02P 7/00*    (2006.01)
(52) U.S. Cl. ...................... 318/268; 318/269; 318/270; 318/271; 318/272; 318/273; 318/274; 318/275; 318/276; 318/277; 318/279; 711/100; 711/101; 711/102; 711/103; 711/104; 711/105; 711/111; 417/20; 417/22
(58) Field of Classification Search ......... 318/268–279; 711/100, 103, 104, 105, 111; 417/22, 20
See application file for complete search history.

(56) References Cited

U.S. PATENT DOCUMENTS

| | | | | |
|---|---|---|---|---|
| 4,054,903 A * | 10/1977 | Ninomiya | ................... | 348/498 |
| 4,120,000 A * | 10/1978 | Ninomiya | ................... | 348/513 |
| 4,768,188 A * | 8/1988 | Barnhart et al. | ............. | 370/434 |
| 4,885,647 A * | 12/1989 | Sugiki et al. | ............. | 360/73.12 |
| 5,269,660 A * | 12/1993 | Pradelle | ...................... | 417/18 |
| 5,526,506 A * | 6/1996 | Hyatt | ........................ | 711/111 |
| 5,594,603 A * | 1/1997 | Mori et al. | ............... | 360/78.04 |
| 5,819,845 A * | 10/1998 | Ryu et al. | .................... | 165/254 |
| 6,331,967 B1 * | 12/2001 | Matsui et al. | .............. | 369/47.3 |
| 7,012,393 B2 * | 3/2006 | De Frutos et al. | ........... | 318/434 |
| 7,183,734 B2 * | 2/2007 | Lassen | .................. | 318/400.34 |
| 2003/0128002 A1 * | 7/2003 | Kokubo et al. | ............. | 318/268 |
| 2005/0077849 A1 * | 4/2005 | Chuan-Fa | ................... | 318/268 |
| 2006/0001391 A1 * | 1/2006 | Sato | ........................... | 318/255 |

* cited by examiner

*Primary Examiner*—Rita Leykin
(74) *Attorney, Agent, or Firm*—Birch, Stewart, Kolasch & Birch, LLP

(57) ABSTRACT

A motor control device includes a recording module and a controlling module. The recording module has a revolution speed table recording a plurality of predetermined revolution speed values. The controlling module receives a reference revolution speed control signal and measures the reference revolution speed control signal to correspondingly generate a reference measuring value. The recording module records the reference measuring value corresponding to one of the predetermined revolution speed values in the revolution speed table.

19 Claims, 5 Drawing Sheets

MOTOR CONTROL DEVICE AND SETTING METHOD THEREOF

BACKGROUND OF THE INVENTION

This Non-provisional application claims priority under 35 U.S.C. §119(a) on Patent Application No(s). 095111461 filed in Taiwan, Republic of China on Mar. 31, 2006, the entire contents of which are hereby incorporated by reference.

1. Field of Invention

The invention relates to a control device and a setting method thereof, in particular, to a motor control device and a setting method thereof.

2. Related Art

Motors have been applied to various electric devices such as electric fans. To maintain the efficiency of the motor, the revolution speed of motor must be controlled and maintained accurately.

As shown in FIG. 1, a conventional control device of a motor includes a controller 10, a converter 14 and a revolution speed measuring device 15. The controller 10 includes an analogue to digital converting (ADC) unit 11, a recording unit 12 and a processing unit 13. The controller 10 controls the operation of a motor 2. The converter 14 converts an externally inputted revolution speed control signal 141, which is a pulse width modulation signal, to a voltage signal 111. The analogue to digital converting unit 11 measures the voltage signal 111 and generates a voltage value 112.

The recording unit 12 presets a revolution speed table 120. The revolution speed table 120 records a plurality of voltage values 121 and a plurality of motor revolution speed values 122 corresponding to the voltage values 121. Thus, the processing unit 13 selects the corresponding voltage value 121 from the revolution speed table 120 according to the measured voltage value 112, and then selects the corresponding motor revolution speed value 122 according to the selected voltage value 121. The processing unit 13 generates a driving current 131 according to the motor revolution speed value 122 so as to drive the motor 2. Additionally, the revolution speed measuring device 15 measures the revolution speed of the motor 2. The processing unit 13 feedback controls the driving current 131 according to the revolution speed of the motor 2, such that the revolution speed of the motor 2 controlled based on the set revolution speed value 122.

Since the revolution speed table 120 is stored in the recording unit 12 previously when the motor 2 is manufactured, and the recording unit 12 is a read only memory, the revolution speed table 120 cannot be modified. Therefore, if the environment of the control device 1 is changed (e.g. by temperature increase or decrease) or if the actual operating values of the internal mechanical elements are different from the specifications, the voltage signal 111 generated by the converter 14 or by the analogue to digital converting unit 11, and/or the voltage value 112 are not equal to the predetermined operating values by a user. For instance, the highest value of the revolution speed control signal 141 originally let the motor 2 operate at the highest speed. However, if the output voltage signal 111 is inaccuracy due to the internal mechanism element of the converter 14, the voltage value 112 read by the revolution speed table may be inaccuracy and thus not corresponded to the highest revolution speed.

Thus, if the revolution speed table in each control device could be set in consideration of possible deviations during the production, all contents in the revolution speed table would satisfy the input/output needs of the clients. Thus, it is an important subjective to provide a control device and a setting method for a motor that can calibrate and adapt to the possible practical operating environment, and further, to control the motor revolution speed precisely and promote the operating efficiency of the motor.

SUMMARY OF THE INVENTION

In view of the foregoing, the invention is to provide a motor control device and a setting method thereof that can pre-calibrate the deviation caused by the manufacturing process to adapt the possible operating environment. Therefore, the motor is precisely controlled so as to improve the operation efficiency.

According to the foregoing objects and others, the present invention provides a motor control device includes a recording module and a controlling module. The recording module has a revolution speed table, which stores a plurality of predetermined revolution speed values. The controlling module receives a reference revolution speed control signal and measures the reference revolution speed control signal to generate a corresponding reference measuring value, wherein the recording module records the reference measuring value corresponding to one of the predetermined revolution speed values in the revolution speed table.

To achieve the above objects and others, the invention discloses a setting method for a motor control device. The setting method includes the following steps: measuring a reference revolution speed signal to generate a corresponding reference measuring value according to the reference revolution speed signal, and recording and storing the reference measuring value in a revolution speed table. The reference measuring value is correspondent to a predetermined revolution speed value previously recorded in the revolution speed table.

As mentioned above, a motor control device and a setting method thereof according to this invention that record the different reference measuring values in a revolution speed table based on the inputs of the different reference revolution speed control signals. Consequently, the values recorded in the revolution speed table can be set one by one so as to make the motor adapt to different operating environments. Hence, the revolution speed of the motor is precisely controlled, and the performance efficiency of the motor is enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The application will be described below with reference to relevant drawings, wherein the same elements are referred with the same reference numbers.

Figure 1:
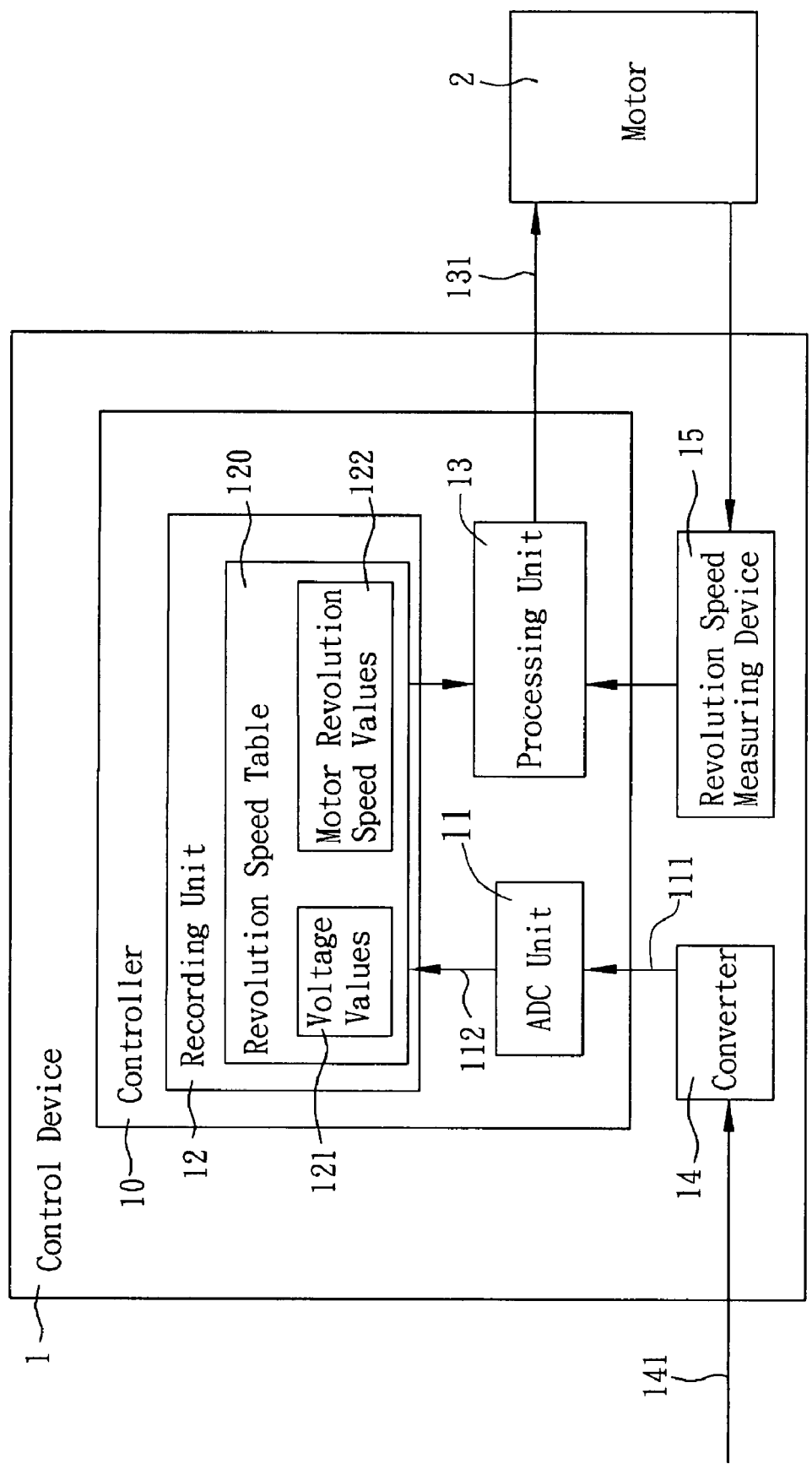
FIG. 1 is a schematic diagram showing the conventional control device of a motor.
Figure 2:
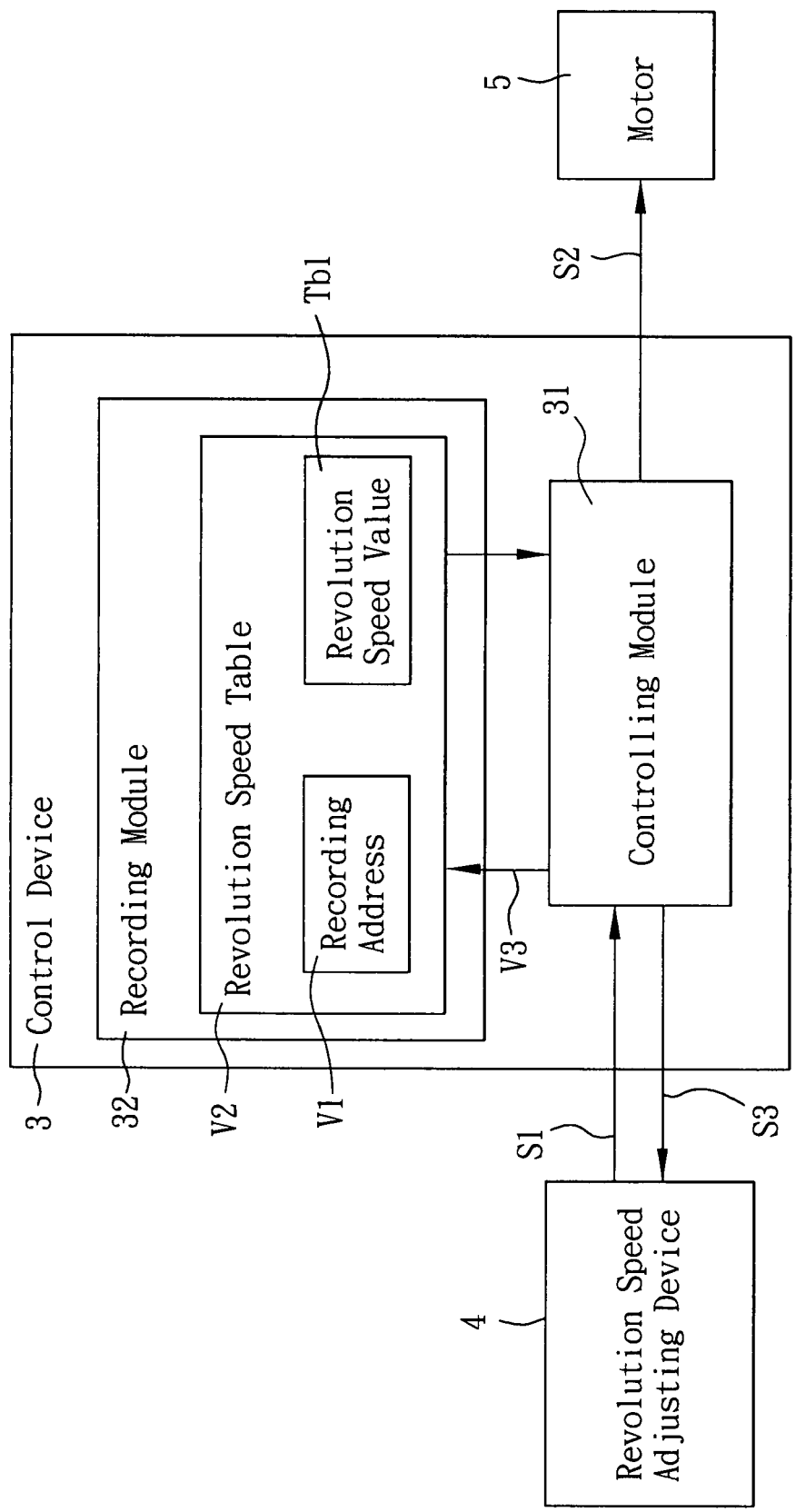
FIG. 2 is a block diagram showing a motor control device according to a preferred embodiment of the invention.

As shown in the FIG. 2, a motor control device 3 according to a preferred embodiment of the invention includes a controlling module 31 and a recording module 32.

The recording module 32 records a revolution speed table Tb1. The revolution speed table Tb1 has a plurality of recording addresses V1 and a plurality of predetermined revolution speed values V2. Each recording address V1 corresponds to a predetermined revolution speed value V2.

The controlling module 31 receives a reference revolution speed control signal S1 and measures the reference revolution speed control signal S1 to generate a corresponding reference measuring value V3. Then the recording module 32 records the reference measuring value V3 in the recording address V1 of the revolution speed table Tb1, corresponding to the predetermined revolution speed value V2.

After the recording module 32 records the reference measuring value V3, the controlling module 31 generates an adjusting signal S3. A revolution speed-adjusting device 4 adjusts the reference revolution speed control signal S1 according to the adjusting signal S3 to output a new reference revolution speed control signal S1, Then, a new reference measuring value V3 is generated and recorded.

As mentioned above, the reference revolution speed control signal S1 is generated by the revolution speed-adjusting device 4. The reference revolution speed control signal S1 may be a pulse width modulation signal in this embodiment. The controlling module 31 generates the various reference measuring value V3 corresponding to the various reference revolution speed control signal S1, and records the various reference measuring value V3 in the recording address V1 corresponding to the predetermined revolution speed value V2 by the method mentioned above.

Figure 3:
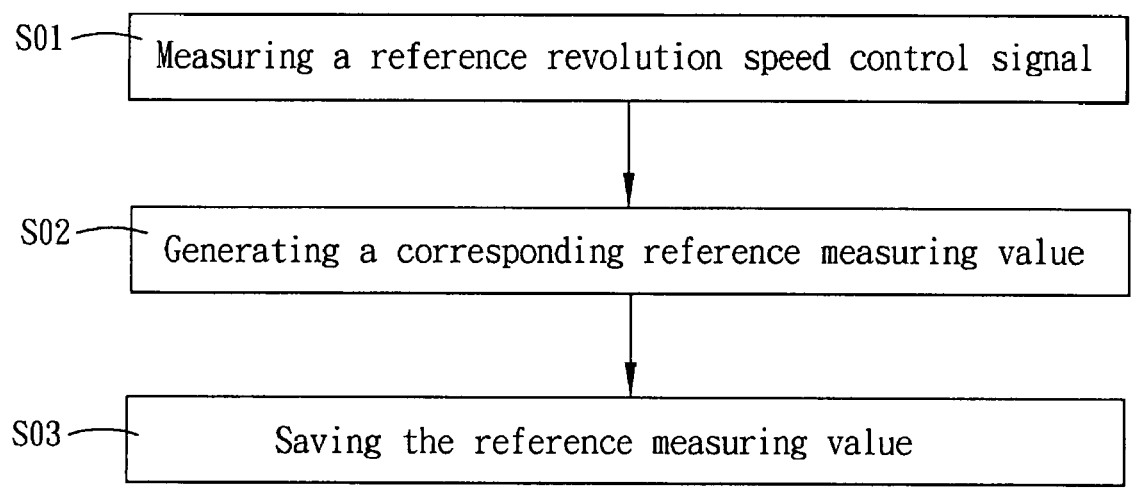
FIG. 3 is a flow chart showing a motor control method according to the preferred embodiment of the invention.

As shown in FIG. 3, a setting method of the motor control device according to a preferred embodiment of the invention includes the following steps S01 to S03. The setting method is applied to the motor control device 3 mentioned in the previous embodiment. Firstly, in step S01, a reference revolution speed control signal is measured. Next, in step S02, a corresponding reference measuring value is generated. Then, in step S03, the reference measuring value is recorded in a revolution speed table corresponding to a predetermined revolution speed value prerecorded in the revolution speed table.

Figure 4:
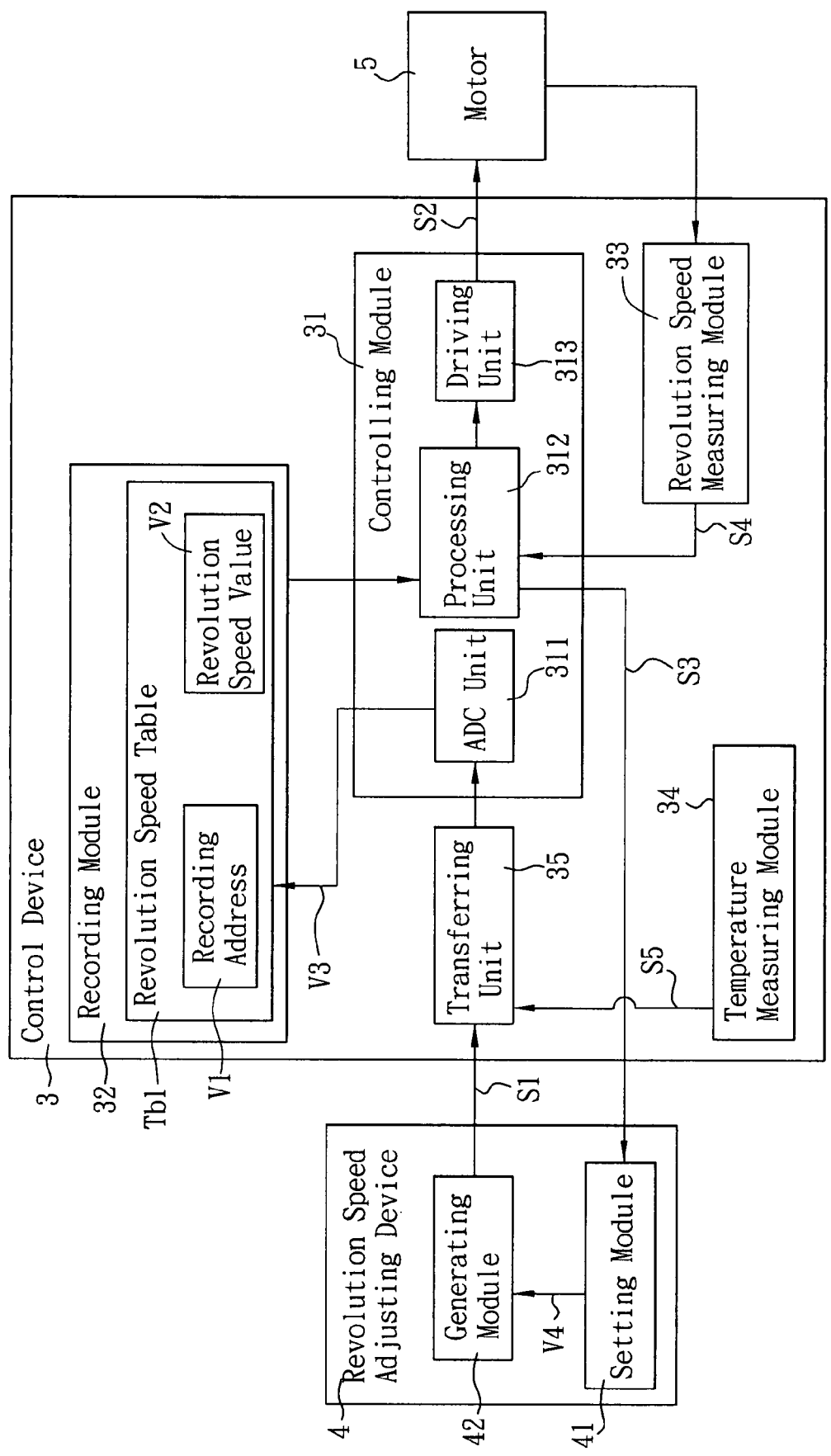
FIG. 4 is a block diagram showing another motor control device according to the preferred embodiment of the invention.
Figure 5:
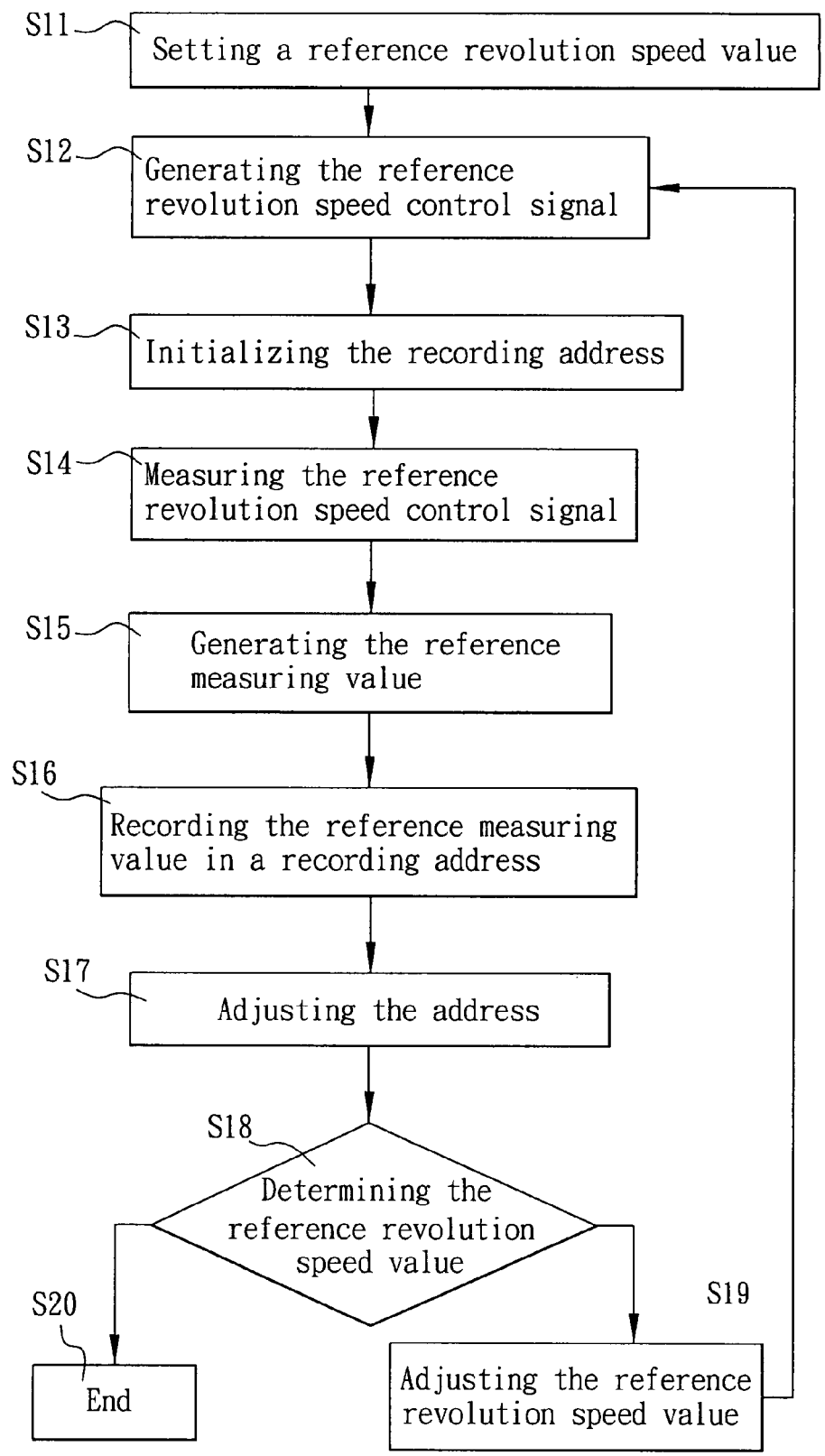
FIG. 5 is a flow chart showing the motor control method for setting the revolution speed table according to the preferred embodiment of the invention.

As shown in FIG. 4 and FIG. 5, the reference revolution speed control signal S1 is generated by an external revolution speed-adjusting device 4 including a setting module 41 and a generating module 42. Furthermore, the motor control device 3 includes a controlling module 31, a recording module 32, a revolution speed-measuring module 33, a temperature-measuring module 34, and a transferring unit 35. The controlling module 31 further includes an analogue to digital converting (ADC) unit 311, a processing unit 312, and a driving unit 313.

Step S11 to step S20 show the procedures of the setting method for the revolution speed table Tb1. In step S11, the setting module 41 sets a reference revolution speed value V4. The setting module 41 may be a counter controlled by the controlling module 31. The reference revolution speed value may be a counting value, and its initial value could be 100 or 0. Hereinafter, the reference revolution speed value V4 is set as 100 for the purpose of the following explanation. The reference revolution speed value V4 represents the duty cycle of the reference revolution speed control signal S1.

In step S12, the generating module 42 receives the reference revolution speed value V4 and generates the reference revolution speed control signal S1 according to the reference revolution speed value V4.

In step S13, the controlling module 31 initializes the recording address V1. The number of recording addresses V1 could be set to one hundred so as to correspond to the reference revolution speed value V4. In step S14, the converting unit 35 receives the reference revolution speed control signal S1, which is a pulse width modulation signal, and then converts the pulse width modulation signal to a voltage signal. In step S15, the analogue to digital converting unit 311 measures the voltage of the converted reference revolution speed control signal S1 so as to generate the reference measuring value V3, which is a digital value. In step S16, the recording module 32 records the reference measuring value V3 in one of the recording addresses V1 of the revolution speed table Tb1. Because the assumed initial reference revolution speed value is 100, the reference measuring value V3 would be set and recorded in the first address of the recording addresses V1, and corresponds to the first address of a predetermined revolution speed values V2. The predetermined revolution speed values V2 are recorded in the revolution speed table Tb1 in a gradually progressive or gradually regressive order. In this embodiment, the first address is the highest revolution speed.

In step S17, after the recording module 32 records the reference measuring value V3, the processing unit 312 adjusts the recording address V1 to the next address or the previous address. For instance, the processing unit 312 adjusts the address V1 to the second address so as to continuously set the following contents of the revolution speed table Tb1.

In step S18, the setting module 41 receives the adjusting signal S3 generated by the processing unit 312 and determines if the reference revolution speed value V4 is 0 or 100. In this embodiment, the setting module 41 determines if the reference revolution speed value V4 is 0, which means 100 addresses have been all set. If the result of the determination is false, the process cycles back to step S19, but otherwise, if the result is true, the process continues to step S20 and ends this setting procedure.

In step S19, the setting module 41 decreases or increases the reference revolution speed value V4. For instance, the setting module 41 decreases by 1. Then, returns to step S12 to decrease or increase the duty cycle of the reference revolution speed control signal S1. For instance, it decreases by 1%. In other words, after the recording module 32 records a reference measuring value V3 in the revolution speed table Tb1, the controlling module 31 controls the setting module 41 to adjust the reference revolution speed value V4 so as to continuously set the following contents of the revolution speed table Tb1.

Furthermore, the setting module 41 could reduce the reference revolution speed value V4 from 100 to 0 gradually or increase from 0 to 100 gradually, so as to decrease the duty cycle of the reference revolution speed control signal S1 from 100% to 0% or increase from 0% to 100%. By the mentioned above method, the motor control device 3 records the reference measuring value V3 corresponding to the reference revolution speed control S1 at every duty cycle in the revolution speed table Tb1.

In addition, each motor 5 can record its own revolution speed table Tb1 by using the method mentioned above. Therefore, whenever the motor 5 receives the reference revolution speed control signal S1 output from the client, it inputs accurately to one driving unit 313 of the controlling module 31 according to the corresponding predetermined revolution speed value V2, and is driven by a driving signal S2 output from the driving unit 313. Thus, the mechanical error of the motor 5 would not be influenced.

In addition, as shown in FIG. 4, the motor control device 3 further includes a revolution speed-measuring module 33 and a temperature-measuring module 34.

The revolution speed measuring module 33 measures the revolution speed of the motor 5 to generate a motor revolution speed signal S4, and the processing unit 312 receives the motor revolution speed signal S4 to adjust the driving signal S2. Thus, the revolution speed-measuring module 33 could be used for tuning the motor revolution speed under the normal operating to maintain the revolution speed of the motor 5 at a constant speed.

The temperature measuring module 34 measures the ambient temperature of the motor 5 to generate a temperature signal S5 and inputs it to the converting unit 35. The temperature-measuring module 34 includes a temperature difference-compensation voltage table (not shown in the figure). In general, the motor 5 sets the revolution speed table Tb1 at the working temperature, for example at 25° C., but in practice, the ambient temperature of the motor 2 changed base on the loading. Temperature changes may influence the internal elements of the motor control device 3 and may cause inaccuracy in the reference measuring value V3 output from the converting unit 35 and the analogue to digital converting unit 311. This results in reading the predetermined revolution speed value V2 inaccurately. Therefore, the temperature measuring module 34 can find the compensating voltage in the temperature difference—compensation voltage table according to the difference between the ambient temperature of the motor 5 and the initial working temperature at 25° C. Moreover, the reference measuring value V3, which is input to the revolution speed table Tb1, is corrected by the original recording value.

Moreover, the controlling module 31 includes a chip or a microprocessor (not shown in the figure), which records procedure commands previously for performing the above-mentioned setting method.

In addition, the recording module 32 includes a rewritable memory. The rewritable memory could be an EPROM, an electric EPROM, or a flash memory.

Furthermore, the controlling module 31 and the recording module 32 could also be implemented via a chip or microprocessor.

In summary, a motor control device and a setting method thereof according to this invention record the different reference measuring values in a revolution speed table based on the inputs of the different reference revolution speed control signals. Consequently, the values recorded in the revolution speed table can be set one by one, so as to make the motor adapt to different operating environments. Furthermore, the revolution speed of the motor can be precisely controlled, and the performance efficiency of the motor can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor control device comprising:
    a recording module having a revolution speed table recording a plurality of predetermined revolution speed values; and
    a controlling module receiving a reference revolution speed control signal and measuring the reference revolution speed control signal to correspondingly generate a corresponding reference measuring value, wherein the recording module records the reference measuring value corresponding to one of the predetermined revolution speed values in the revolution speed table,
    wherein the reference revolution speed control signal is adjusted and outputted by a revolution speed-adjusting device, and the revolution speed-adjusting device comprises:
        a setting module setting a reference revolution speed value; and
        a generating module receiving the reference revolution speed value to adjust the reference revolution speed control signal wherein the generating module outputs the adjusted reference revolution speed control signal,
    wherein the recording module records the reference measuring value, the controlling module generates an adjusting signal, and the setting module receives the adjusting signal to set the reference revolution speed value again.

2. The motor control device as claimed in claim 1, further comprising:
    a converting unit converting the reference revolution speed control signal to a voltage signal so as to generate the reference measuring value.

3. The motor control device as claimed in claim 1, wherein the controlling module comprises:
    an analog-to-digital converter measuring the voltage of the reference revolution speed control signal to generate the reference measuring value.

4. The motor control device as claimed in claim 1, wherein the controlling module comprises:
    a processing unit selecting the predetermined revolution speed values corresponding to the reference measuring value from the revolution speed table, and generating a driving signal according to the selected predetermined revolution speed value to drive the motor.

5. The motor control device as claimed in claim 1, wherein the controlling module further comprises:
    a driving unit generating a driving signal according to the predetermined revolution speed value so as to drive the motor.

6. The motor control device as claimed in claim 1, wherein the reference revolution speed control signal is a pulse width modulation signal, and the reference measuring value is a voltage value.

7. The motor control device as claimed in claim 1, wherein the recording module comprises at least one recording address for recording the reference measuring value.

8. The motor control device as claimed in claim 7, wherein the reference measuring value is recorded to the first recording address in gradually regressive order or the last recording address in gradually progressive order, and the first recording address or the last recording address of the predetermined revolution values is the highest revolution value.

9. The motor control device as claimed in claim 1, wherein the recording module comprises a rewritable memory for saving the revolution speed table, and the rewritable memory is an erasable PROM, an electric EPROM or a flash memory.

10. The motor control device as claimed in claim 1, wherein the controlling module is a chip or a microprocessor.

11. The motor control device as claimed in claim 1, wherein the controlling module and the recording module are integrated in a chip or a microprocessor.

12. The motor control device as claimed in claim 1 further comprising:
    a revolution speed measuring module measuring the revolution speed of the motor to generate a motor revolution speed signal, wherein the controlling module receives the motor revolution speed signal to correct the revolution speed of the motor.

13. The motor control device as claimed in claim 1 further comprising:
a temperature measuring module measuring the ambient temperature of the motor to generate a temperature signal, wherein the controlling module receives the temperature signal to correct the reference measuring value.

14. The motor control device as claimed in claim 13, wherein the temperature measuring module comprises a temperature difference—compensation voltage table, and the motor selects a compensating voltage according to the temperature difference—compensation voltage table to adjust the reference measuring value when the ambient temperature of the motor is different from a predetermined working temperature.

15. A setting method for a motor control device comprising steps of:
measuring a reference revolution speed control signal;
generating a reference measuring value according to the reference revolution speed signal;
recording the reference measuring value in a revolution speed table corresponding to a predetermined revolution speed value, wherein a revolution speed value is recorded previously in the revolution speed table;
setting the reference revolution speed value to adjust the reference revolution speed control signal according to the reference revolution speed value in order to generate a different reference measuring value and record the different reference measuring values in the revolution speed table;
generating an adjusting signal; and
setting the reference revolution speed value again.

16. The setting method as claimed in claim 15, wherein the reference measuring value is recorded from the first recording address in descending order or the last recording address in ascending order.

17. The setting method as claimed in claim 16, wherein the revolution speed table has a plurality of predetermined revolution speed values, and the predetermined revolution speed values are recorded in gradually regressive order or progressive order.

18. A motor control device comprising:
a recording module having a revolution speed table recording a plurality of predetermined revolution speed values; and
a controlling module receiving a reference revolution speed control signal and measuring the reference revolution speed control signal to correspondingly generate a corresponding reference measuring value, wherein the recording module records the reference measuring value corresponding to one of the predetermined revolution speed values in the revolution speed table, and wherein the reference revolution speed control signal is adjusted and outputted by a revolution speed-adjusting device, and the revolution speed-adjusting device comprises:
a re-recordable setting module setting a reference revolution speed value; and
a generating module receiving the reference revolution speed value to adjust the reference revolution speed control signal wherein the generating module outputs the adjusted reference revolution speed control signal.

19. The motor control device as claimed in claim 18, wherein the recording module records the reference measuring value, the controlling module generates an adjusting signal, and the re-recordable setting module receives the adjusting signal to set the reference revolution speed value again.

* * * * *